US005556452A

United States Patent [19]
Kalt et al.

[11] Patent Number: 5,556,452
[45] Date of Patent: Sep. 17, 1996

[54] MOULDING MATERIALS AND SPINNING MATERIALS CONTAINING CELLULOSE

[75] Inventors: Wolfram Kalt, Lenzing; Johann Männer, Weyregg; Heinrich Firgo, Vöcklabruck, all of Austria

[73] Assignee: Lenzing Aktiengesellschaft, Lenzing, Austria

[21] Appl. No.: 293,056

[22] Filed: Aug. 19, 1994

[30] Foreign Application Priority Data

Sep. 14, 1993 [AT] Austria ................................ 1857/93

[51] Int. Cl.$^6$ ........................ C08L 1/02; C08L 1/24; C09D 101/02; C09D 101/24
[52] U.S. Cl. ........................ 106/166.01; 106/166.42; 106/166.41; 106/204.01
[58] Field of Search ........................ 106/164, 165, 106/176, 180, 186, 198, 203

[56] References Cited

U.S. PATENT DOCUMENTS

| | | |
|---|---|---|
| 2,179,181 | 11/1939 | Graenacher et al. |
| 3,447,939 | 6/1969 | Johnson . |
| 3,447,956 | 6/1969 | Johnson . |
| 3,508,941 | 4/1970 | Johnson . |
| 4,880,469 | 11/1989 | Chanzy et al. |
| 5,216,144 | 1/1993 | Eichinger et al. ........................ 536/56 |

FOREIGN PATENT DOCUMENTS

| | | |
|---|---|---|
| 393841 | 3/1990 | Austria . |
| 1251880 | 12/1983 | Canada . |
| 47929 | 3/1982 | European Pat. Off. . |
| 356419 | 2/1990 | European Pat. Off. . |
| 553070 | 7/1993 | European Pat. Off. . |
| 2450293 | 10/1980 | France . |
| 2000082 | 7/1971 | Germany . |
| 3021943 | 12/1981 | Germany . |
| 158656 | 1/1983 | Germany . |
| 218104 | 1/1985 | Germany . |
| 229708 | 11/1985 | Germany . |
| 8304415 | 12/1983 | WIPO . |
| 9311287 | 6/1993 | WIPO . |

OTHER PUBLICATIONS

Buijtenhuis, F. A. et al., "The Degradation and Stabilization of Cellulose Dissolved in N—Methylmorpholine—N—Oxide" (NMMO), Das Papier, vol. 12, pp. 615–619 (1986).
Ferris, J. P. et al., "Detoxication Mechanisms III. The Scope and Mechanism of Iron–Catalyzed Dealkylation of Tertiary Amine Oxides", J. Organic. Chem., vol. 33, No. 9, pp. 3493–3498 (1968).
Golova, L. K. et al., "Dissolution of Cellulose in Mixtures of N—Methymorpholine—N—Oxide with Amines of Varied Nature", Polymer Science U.S.S.R., vol. 28, No. 11, pp. 2565–2570.
Guthrie, J. T. et al., "The Celulose/N—methylmorpholine—N—oxide/H$_2$0 solution system; degradation aspects, Cellulose sources and exploitation", Chapter 6, Ellis Horwood Ltd., Chickester, U.K., pp. 49–57 (1990).
Loubinoux, D. et al. "An Experimental Approach to Spinning New Cellulose Fibers with N–Methylmorpholine–Oxide as a Solvent", Textile Research Journal 57, No. 2, pp. 61–65 (1987).
Golova, L. K. et al., "Thermische Stabilität von Lösungen der Zellulose in Methylomorpholin–N–oxid und Lösungsmittelsystemen auf dessen Basis", Khim. Volokna, 29, Nr. 3, pp. 30–32 (1987).
Götze, K., Chemifasern nach des Viskoseverfahren, 2nd vol, 3rd Edition, pp. 1003–1004. (no date avail.)
Lang, H. et al., Untersuchungen An Lösungen Von Cellulose in N—Methylmorpholoin—N—Oxide (MMNO), "Cellulose Chemistry and Technology", 20, No. 3, pp. 289–301 (1986).
Loubinoux, D. et al., "An experimental Approach of Spinning New Cellulose Fibres with NMMO (N—Methymorpholine—Oxide) as Solvent of Cellulose", Lenzinger Berichte, No. 59, pp. 105–110, Aug. 1985.
Lukanoff, B. et al., "Untersuchungen zum thermischen Abbau von Cellulose unterhomogenen Reaktionsbedingungen", Acta Polymerica 35, Nr. 5, pp. 339–343 (1985).
Taeger, E. et al., "Probleme der schwefelkohlenstofffreien verformung von Zellulose zu textilen Zellulosefäden mittels N–Methylmorpholin–N–oxids", Formein, Faserstoffe, Fertrgwasse, 4, pp. 14–22 (1985).
Taeger E. et al., "Untersuchungen zur Auflösung und Verformung von Cellose in N–Methylmorpholin–N–Oxid", Das Papier, 12, pp. 784–788 (1991).

Primary Examiner—David Brunsman
Attorney, Agent, or Firm—Brumbaugh, Graves, Donohue & Raymond

[57] ABSTRACT

Moulding material and spinning material respectively containing cellulose, an aqueous tertiary amine-oxide, a non-solvent and a stabiliser, characterised in that, one or more stabilisers are provided which altogether have a basic and antioxidant action with the proviso that the basic stabiliser is not phosphate. The moulding material and spinning material respectively according to the invention are thermally stabilised against a runaway of the decomposition reaction. The degradation of the cellulose and of the amine-oxide is also largely prevented.

35 Claims, 3 Drawing Sheets

MOULDING MATERIALS AND SPINNING MATERIALS CONTAINING CELLULOSE

The invention concerns a moulding material and a spinning material respectively which contains cellulose, an aqueous tertiary amine-oxide, a nonsolvent for cellulose especially water, and a stabiliser. The invention further concerns a process for the preparation of a cellulose spinning material and a process for the preparation of cellulose mouldings, especially fibres and films.

Tertiary amine-oxides are known to be alternative solvents for cellulose. From U.S. Pat. No. 2,179,181 for example it is known that tertiary amine-oxides have the property of dissolving cellulose without it having to be converted into derivatives, and that cellulose mouldings such as fibres can be obtained from these solutions by precipitation. In U.S. Pat. No. 3,447,939, U.S. Pat. No. 3,447,956 and U.S. Pat. No. 3,508,941 cyclic amine-oxides are recommended as further solvents. Beyond that the following are named as examples: dimethylethanol-amine-oxide, triethylamine-oxide, N-methylpiperidine-N-oxide and N-methyl-pyrrolidine-N-oxide. Other tertiary amine-oxides are known from the EP-A 0 553 070 of the Applicant. All tertiary amine-oxides which have the property of dissolving cellulose are intended in the following when, for the sake of simplicity, merely NMMO (= N-methylmorpholine-N-oxide) is named in so far as nothing contrary is said in other parts of the text. Moreover the moulding material or the spinning material containing cellulose is called the "NMMO-cellulose-solution".

Tertiary amine-oxides as alternative solvents offer an advantage in that, contrary to the viscose process, the cellulose is dissolved by NMMO without prior conversion into a derivative and for this reason the cellulose does not have to be chemically regenerated; the NMMO remains chemically unchanged and during precipitation it is taken up by the precipitation bath from whence it can be recovered for making fresh solutions. The NMMO process thus offers the possibility of a closed solvent cycle. In addition NMMO has an extremely low toxicity.

A process for making solutions of cellulose in tertiary amine-oxides is known for example from FR-A 2 450 293. According to Example 2 of this document, cellulose is mixed with N-methylmorpholine-N-oxide (NMMO) which occurs in solid form as hydrate containing 9.5% water, and this solid mixture is melted in an extruder. The cellulose then dissolves when the water content is below 17%.

Processes which use solid amine-oxides (hydrates) as starting materials can indeed be carried out in extruders, wherein dissolving of the cellulose is started by simple melting of the amine-oxide hydrate. These processes are costly however because they start from commercially-available aqueous amine-oxide solutions or from used spinning baths after purification. Before preparation of the solution therefor relatively large amounts of water must be removed to concentrate the NMMO solution which is not possible in an extruder because a high capacity for evaporation cannot be attained. This process was initially carried out in a stirred vessel or in a mixer respectively.

Removal of water is poor when a stirred vessel is used because of the unfavourable ratio between the surface area of the liquid and the volume of the liquid, leading to residence times of many hours in the stirred vessel. Partial degradation of the tertiary amine-oxide and the polymeric cellulose chain also occurs during this period; this process being more favoured at the elevated temperature. This partial degradation has an effect on the reliability of spinning and on certain properties of the end product such as for example its tensile strength, its elongation and its loop strength. Furthermore it is known that severe darkening may occur due to degradation of the amine-oxide used.

Degradation of Cellulose in NMMO

The degree of polymerisation of cellulose decreases when it is dissolved in NMMO and its molecular weight distribution becomes narrower [Golova et al, Khim Volokna, No. 3, page 30 (1987)]. In the "melt solution" of cellulose in NMMO, initial chain cleavage occurs many times faster than could be explained by pure thermal or thermo-hydrolytic degradation of the cellulose. Additionally it was observed that the increase in degradation depends on the degree of purity of the NMMO [B. Lukanoff et al, Acta Polym, 35, No 5, page 339 (1984)].

It is also reported in the literature that the degradation of cellulose in NMMO at 120° C. does not occur hydrolyrically but by a "directly oxidative" process at the end groups of the polymeric cellulose chain. Additionally the presence of metal ions (for example $Fe^{3+}$) in particular leads to radically initiated chain cleavage and thus to obvious degradation of the cellulose and of the solvent [Buijtenhuijs et al, The degradation and stabilisation of cellulose dissolved in N-methylmorpholine-N-oxide [NMM], in "Das Papier", 40th Year, Vol 12, pp 615–619, 1986].

An approximately two-fold increase in the carboxyl group content of linters specimens subjected to thermal treatment in NMMO could be demonstrated (Lukanoff et al, see above), By the use of various stabilisers, experts have attempted for many years to prevent the degradation of cellulose which is quite generally observed in solution and not only in NMMO. This is shown in the following publications:

In the case of alkali-cellulose, it is known from DE-A 2 000 082 that an antioxidant should be added when treating the cellulose with alkali to prevent oxidative degradation of the cellulose used. Pyrocatechol, pyrogallol and gallic acid for example are cited as antioxidants. Antioxidants should slowdown the decrease in relative viscosity of NMMO-cellulose-solutions when heated, wherein hydroquinone proves to be the most effective [Golova et al, Khim Volokna, No. 3, page 30 (1987)]. Elsewhere it has been suggested that citric acid and/or glucose be added to reduce polymer degradation (DE-A 3 021 943). According to EP-A 0 047 929 none of these additives have a satisfactory effect and organic compounds, such as glyceraldehyde and compounds which have at least four carbon atoms with two conjugated double-bonds and at least two hydroxyl and/or amino groups with at least one hydrogen atom, should show a better effect. These materials also function as antioxidants. In EP-A 0 047 929 gallic acid propyl ester (GPE) is cited as the most active additive. GPE is also cited as a stabiliser in a series of later literature references or patent documents [for example Buijtenhuijs et al, (1986) see above; Loubinoux D et al, Lenzinger Berichte, No. 59, page 105 (1985); Text Res J, 57, No. 2, page 61 (1987); CA-A 1 251 880 and U.S. Pat. No. 4,880 469].

GPE however has severe disadvantages. Thus GPE prevents hardly any reactions at oxidisable end-groups, even if GPE on the whole does retard cellulose degradation [Buijtenhuijs et al, (1986) see above]. According to DD-A 0 218 104 moreover, GPE leads to darkening; of the NMMO-cellulose-solution and reaction products of GPE accumulate when it is recycled. Similar behaviour is known from the AT-B 393 841 of the Applicant.

Gallic acid, the acid on which the cited ester is based, can also act just like ascorbic acid not only as an antioxidant but also as an autoxidant, which is also a disadvantage. A more severe disadvantage of GPE is that it cannot eliminate the thermal instability of the NMMO-cellulose-solution (see below). This was first established by Buijtenhuijs et al, (1986, see above). Furthermore studies by the inventor of the present invention show that in certain conditions in the presence of metals, GPE can even increase the thermal instability of NMMO-cellulose-solutions (see below).

It is known from DD 158 656 that substances which have a reducing action towards amine-oxides also counteract the degradation of cellulose. Substances such as these are cited as follows: nitrogen-containing substances such as amines, urea, hydroxylamine and hydrazine, sulphur-containing substances which have a reducing action such as sulphites, thiosulphates, dithionites, thiourea or sulphur, and compounds containing C, H and O which have a reducing action such as aldehydes and reducing sugar.

It is known from DD-A 0 229 708 that phenols, especially 2,6-ditertiary.butyl-p-cresol and a mixture of these compounds with alkali hexametaphosphate, prevent the thermooxidative degradation of cellulose.

By the use of compounds acting purely as antioxidants, the formation of coloured components in the NMMO-cellulose system can be reduced [Guthrie et al, "Cellulose sources and exploitation", Ed. J F Kennedy, G O Phillips, P A Williams (Ellis Horwood Ltd, Chichester, UK), Chapter 6, page 49 (1990)].

Also in the presence of amines the degradation of cellulose is said to be reduced [Golova et al, Vysokomol Soedin, Set A 28, No. 11, page 2308 (1986)].

Degradation of NMMO

Amine-oxides generally exhibit only limited thermal stability which varies depending on the structure. In normal conditions the monohydrate of NMMO occurs as a white crystalline solid melting at 72° C. The anhydrous compound on the other hand only melts at 172° C. A strong darkening occurs at 120°/130° C. when the monohydrate is heated. At 175° C. an exothermic reaction occurs in an explosive fashion with complete dehydration of the melt and vigorous gas evolution reaching temperatures above 250° C. being attained [see above Taeger et al, (1985); Lang et al, Cell Chem Technol, 20, No. 3, page 289 (1986)].

The thermal degradation of NMMO mostly gives N-methylmorpholine, morpholine, formaldehyde, N-formylmorpholine and $CO_2$. This degradation is presumably partly of a radical nature and is further accelerated by metal ions [Taeger et al, Formein, Faserstoffe, Fertigware, 4, pages 14–22 (1985), and Taeger et al, Das Papier, No. 12, page 784 (1991)].

Metallic iron and copper, and their salts in particular, considerably reduce the decomposition temperatures of NMMO, and the respective decomposition velocity is simultaneously increased [Ferris et al, J Org Chem, 33, page 3493 (1986); Taeger et al, (1985), see above; Lang et al, (1986), see above; Buijtenhuijs et al, (1986) see above].

Even cellulose itself strongly promotes the decomposition of a melt of NMMO-monohydrate, where it has been shown that cellulose only increases the velocity of the NMMO decomposition process and does not affect its character [see above, Teager et al, (1985); Lang et al, (1986); Buijtenhuijs et al, (1986) and Golova et al (1987)].

According to EP-A 0 111 518 phosphoric acid and phosphonic acid and their salts and complexes with metal ions should stabilise the solvent, namely NMMO, and cellulose by reducing the velocity of the degradation process. Also in another reference, the stabilising effect of compounds based on phosphorus, especially sodium hexametaphosphate and hydroxyethyl-diphosphonic acid, is described [see above, Guthrie et al (1990)]. According to DD-A 0 229 708 however, the degradation of the NMMO in NMMO-cellulose-solutions is not inhibited or not sufficiently inhibited at the processing temperatures.

To prevent degradation of the NMMO and the cellulose, it is known from DD-A 0 218 104 that one or more basic substances in amounts between 0.1 and 10 mol % based on the cellulose solution should be added to the amine-oxide. Alkali hydroxides for example NaOH, salts reacting as base for example $Na_2CO_3$, and organic nitrogen bases are recommended as basic substances. It has been shown however that additions of basic substances slow down the thermal decomposition of NMMO but they do not effect complete inhibition [Langet al, Cell Chem Technol, 20, No. 3, page 289 (1986)]. In addition to that, studies by the inventor of the present invention have shown that the addition of basic substances cannot prevent the degradation of cellulose during lengthy thermal exposure, Stabilisation with bases as such is not therefore suitable to fulfil simultaneously both requirements of the NMMO process, namely the reliable prevention not only of NMMO degradation but also of cellulose degradation.

The multiplicity of the decomposition processes makes stabilisation of the NMMO-cellulose-solutions difficult. Despite numerous optimisation experiments, there has so far been no success with the stabilisers mentioned above in preventing the degradation of NMMO and cellulose simultaneously in a satisfactory way. The numerous attempts to solve that problem which are given in the literature reflect this fact.

There is usually another problem in addition to the problems cited above, namely the thermal instability of the NMMO-cellulose-solution itself, By this is meant the occurrence of uncontrollable decomposition processes in these solutions at the elevated process temperature (about 110°–120° C.) which, due to the evolution of gases, can lead to vigorous deflagrations, fires and even to explosions.

There is very little evidence found in the literature about the thermally unstable nature of the solution, namely the extrusion mixture. The first clear reference to this phenomenon was made in 1986 by Buijtenhuijs et al. In some circumstances, especially in the presence of metal ions, the decomposition reactions in the spinning material can run away, On account of the metal construction of the plant components however, metal ions in the solution can never be excluded.

This runaway reaction cannot be prevented even by the addition of GPE [Buijtenhuijs et al, 1986]. On the contrary, studies by the inventor of the present invention have shown that GPE and also other aromatic hydroxy compounds with good complexing properties increase still further the thermal instability of the NMMO-cellulose-solution in the presence of metals; this means that GPE (co)triggers the dangerous running away or the explosions (see also below).

Stabilising measures have not so far been found which adequately stabilise the NMMO and the cellulose and which at the same time also clearly reduce the thermal instability of the NMMO-cellulose-solution, thus preventing explosive decomposition under process conditions. It is obvious that the thermal instability of heated spinning materials is a special problem because these spinning materials are a safety risk in those parts of the plant having large volumes, such as stirring vessels, mixers and the like.

To avert the danger of explosion in the solution preparation stage and to keep the thermal stress on the solution at a low level, the preparation of the solution in a filmtruder instead of in a stirred vessel or the like is known from EP-A 0 356 419. In the course of this process the suspension of cellulose in NMMO, which can have a water content up to 40%, is spread out in a layer and transported over the heated surface of the filmtruder, thereby being exposed to elevated temperature and reduced pressure to remove water, until the cellulose goes into solution. In a cost-effective way this allows rapid heating of the suspension to the temperatures necessary to prepare the solution, and rapid preparation of the solution at the same time so that decomposition of the tertiary amine-oxide and degradation of the cellulose can be largely prevented. Furthermore the safety risk when compared with preparing the solution in a stirring vessel is substantially less because only comparatively small amounts of solvent, instead of large amounts of solvent, have to be heated all at once.

By employing technical measures, the process described in EP-A 0 356 419 therefore reduces the safety risk when preparing cellulose solutions. The possibility still exists however of exotherms, deflagrations etc, occurring during the processing of finished solutions, in those parts of the plant located on-line between the filmtruder and the spinning machine, such as stirring vessels.

The thermal instability of the heated NMMO-cellulose-solution and the associated danger is still a problem today. This is the starting point of the present invention which has as its object to develop the overall process of cellulose processing, namely the process steps from the preparation of the cellulose solution up to the actual preparation of the moulded bodies, so that dangerous exotherms cannot occur and where at the same time the degradation of cellulose and NMMO is kept as low as possible. The objective of the present invention therefore is the further development of the NMNO-process so that it can be carried out without danger.

The cited objective can be attained according to the invention with a moulding material and a spinning material respectively which contains the cellulose, an aqueous tertiary amine-oxide, a non-solvent and one or more stabilisers which function altogether as an antioxidant and as a bases with the proviso that no phosphate is provided as basic stabiliser. An antioxidant and OH⁻ ions are preferably provided as stabilisers.

The term "antioxidant" is to be understood to include all substances and mixtures of substances which counteract the oxidative and radical degradation of cellulose. Even scavengers and reducing agents naturally fall within this term. Such substances are the polyphenols, hydroxypolycarboxylic acids, trioxybenzenes, etc, which are known for example from DE-A 2 000 082. Preferred antioxidants are tannins and those substances which are cited in EP-B 0 047 929, i.e., glyceraldehyde and/or one or more organic compounds which have at least four carbon atoms and at least two conjugated double bonds and at least two hydroxyl groups and/or amino groups with at least one hydrogen atom. Pyrocatechol, pyrogallol, gallic acid, and the methyl, ethyl, propyl and isopropyl esters of gallic acid are especially preferred. Also hydroquinone, anthraquinone and compounds which are structural analogues, as well as their derivatives, can be used as antioxidants.

The invention is based on the finding that cellulose degradation and the explosive runaway decomposition reactions occurring in heated NMMO-cellulose-solutions can be effectively prevented in a simple fashion if the solution is treated not only with an antioxidant but also with an adequate amount of alkali. This can be done in several ways. Thus for example a mixture of two substances (antioxidant and base) can be present in the solution.

A single substance can also be added however as long as it combines both functions in the molecule; the substance thus functions as an antioxidant and is also adequately basic, Such a substance is for example tris-(2,4,6-dimethylamino)-phenol.

Whether there is sufficient minimum basicity present in the cellulose solution, within the sense of the present invention, can be determined by means of the micro-test described below, it has been shown that in any case this criterion is fulfilled when the carboxylic acids arising from the degradation processes are contained in a neutralised state in the aqueous NMMO used for making the cellulose solution, The amount of necessary base which must be added to the solution to do this can be determined simply by titration in aqueous MNNO and represents a preferred amount of base. It is convenient to add an excess of base in order to have a reserve of base in the cellulose solution to buffer further acids arising during the course of the process (see below).

The antioxidative and basic effect on the cellulose solution, in accordance with the invention, ensures that not only an explosive runaway decomposition reaction in the solution is safely prevented but also that degradation of the cellulose and the NMMO is counteracted, it has indeed been shown that the simultaneous antioxidative and basic action on the solution has a synergistic effect with regard to the repression of cellulose degradation.

On the basis of numerous tests inventors have established that during the heating of NMMO in a closed system there is a dramatic shift of the pH towards lower values in the presence of metal salts and/or metals and/or metal components, Also during the course of degradation reactions in NNMO-cellulose-solutions, acids are formed which cause the pH to fall, These acids lead to a reduction in stability of the N-O bond in NMMO and thus to further decomposition. Moreover it can be proven that the acids lead to sensitisation of the solution against metal ions and metallic particles, thus giving a dramatic reduction in the decomposition temperature of NMMO which obviously can trigger off a runaway decomposition reaction.

This undesirable behaviour can indeed be counteracted by stabilising the NMMO by addition of a base but stabilisation by the exclusive use of bases is strongly concentration dependent and it is therefor very sensible in practice.

It can be shown on the one hand that low base concentrations offer scarcely any effective stabilisation against degradation processes, but on the other hand the use of high base concentrations are questionable since, especially at prolonged heating periods, decomposition is set off which is initially retarded but which is then all the more rapid and degradation of the cellulose occurs. These decomposition processes form acids and consume bases: and therefore also shift the pH value towards lower values. The stability of NMMO also decreases with increasing acid content. It is assumed that such a build-up of the individual decomposition processes eventually leads to the initiation of a kind of chain reaction.

It has now been shown that the shift of the pH towards the acidic region can be halted when the cellulose is additionally stabilised against degradation with an antioxidant. Tannins, phenols, aromatic polyhydroxy compounds and especially the propyl ester of gallic acid are particularly suitable antioxidants. The stabilising function of the antioxidant is not only unaffected by the simultaneous presence of basic substances but it is actually enhanced since the undesirable side-effect of GPE, namely to increase thermal instability of the NMMO-cellulose-solution in the presence of metal ions, is overcome.

The fact that the base does not affect the function of the antioxidant is surprising, especially when the preferred GPE is used, since the expert would assume that because the GPE is an ester it would immediately be destroyed by hydrolysis at the high temperature prevailing in the preparation of the solution (> 110° C.) and in the basic environment of the NMMO (the pH of the aqueous NMMO-solution which is used to prepare the cellulose solution according to the invention is preferably >11).

A further positive outcome of the simultaneous action of base and antioxidant on the solution is that cellulose degradation is still further inhibited compared to the sole action of the antioxidant.

By the combined action of antioxidant and base according to the invention it is thus possible to inhibit still further the degradation of cellulose and NMMO than is the case with the action of the respective individual agents, and moreover the uncontrollable runaway decomposition process can be prevented.

Alkali salts and also alkaline-earth salts, especially the carbonates, can be used as bases as can the hydroxides. Phosphates are not generally recommended and phosphonic acids, which have been proposed as stabilisers in the literature, are wholly unsuitable to achieve the objective of the present invention on account of their acidic character. Amines and mixtures of the first-named compounds with amines are well suited. Preferred bases for use are alkali hydroxides, especially sodium hydroxide, and/or amines.

A moulding material or a spinning material containing the propyl ester of gallic acid as the substance act as an antioxidant, and sodium hydroxide as the substance acting as a base, has proved to be especially effective.

In the moulding material or the spinning material according to the invention, the antioxidant is desirably used at a concentration of at least 100 ppm based on the cellulose.

It has been shown to be effective when the substance acting as an antioxidant is partly or wholly hydroxylamine or hydrazine, or a corresponding product or derivative of these compounds respectively, or a substituted compound or their salts. It has been shown that hydroxylamine is very well suited according to the invention, in combination with another antioxidant and with a substance with a basic action, to achieve the objective of the present invention. NMMO is the preferred tertiary amine to be used.

The invention also concerns a process for the preparation of the moulding materials and the spinning materials respectively according to the invention, in which process the cellulose is suspended in aqueous NNMO and the cellulose suspension so obtained is converted into the moulding material or the spinning material respectively by the application of heat and reduced pressure, and the process is characterised in that, (x) an aqueous tertiary amine-oxide is used to which a base has been added, and that (y) a cellulose suspension is used which contains a stabiliser functioning as an antioxidant.

The invention further concerns a process for the continuous preparation of cellulose mouldings, in which process the following steps are undertaken:

(a) cellulose is mixed into an aqueous tertiary amine-oxide, whereby a cellulose suspension is obtained, (b) a cellulose solution is formed from the cellulose suspension by the application of heat and reduced pressure, (c) the cellulose solution is moulded and is led into an aqueous precipitation bath whereby a cellulose moulding and a used precipitation bath are formed, (d) the used precipitation bath is purified, and (e) the purified precipitation bath is concentrated to obtain a second aqueous tertiary amine-oxide which is used again in step (a), characterised in that, after step (c) and before step (b) one or more stabilisers are introduced into the process, which altogether have a basic and antioxidant action.

A process for the preparation of cellulose mouldings with recovery of NMMO is known from WO 93/11287. The purification of the used precipitation bath is carried out by means of a strongly basic ion exchanger.

A preferred embodiment of the process according to the invention consists of the stabiliser acting as an antioxidant being introduced immediately before or during the step (a) in the process according to the invention.

A further preferred embodiment of the process according to the invention is characterised in that the stabiliser acting as a base is introduced into the process after step (c) and before step (a).

Those compounds which have already been cited above in detail are the best to use as antioxidants and as bases.

N-methylmorpholine-N-oxide is used as the preferred tertiary amine-oxide in the process according to the invention.

An especially preferred embodiment of the process according to the invention uses a filmtruder for the preparation of the cellulose solution from the cellulose suspension.

The invention is still further explained by the following tests. The tests on thermal instability were carried out according to Buijtenhuijs et al [The degradation and stabilisation of cellulose dissolved in N-methylmorpholine-N-oxide (NMM), in "Das Papier", 40th year, Vol 12, pp 615–619, 1986] using the DSC technique (= differential scanning calorimetry; equipment used: Nettler Pressure DSC Thermosystem 4000).

A) Effect of Acids and/or Metal Ions on the Spinning Material

The undesirable effect of acids and/or metals or metal ions respectively on the thermal stability of spinning materials can be seen in the following Table I. The spinning material used in the tests contained 76.5 wt % NMMO, 12 wt % cellulose and 11.5 wt % $H_2O$. It was prepared according to EP-A 0 356 419. Thermal analyses were undertaken each time in the temperature region from 40° to 280° C. with a heatup rate of 10° C./min (under nitrogen at 20 bar back pressure). "Onset", "maximum" and "endset" respectively indicate those temperatures at which an exotherm started (exotherm= the above-mentioned runaway of the decomposition reaction), reached its maximum, and ended. The lower these temperatures, the lower the thermal stability of the specimen.

TABLE I

| Test No. | Additive | Onset | Maximum | Endset |
|---|---|---|---|---|
| 1 | — | 204.3 | 228.3 | 236.0 |
| 2 | $Fe_2O_3$ | 191.5 | 204.5 | 211.1 |
| 3 | Spinning material + HCOOH | 145.4 | 174.8 | 191.1 |
| 4 | Spinning material + $Fe_2O_3$ + HCOOH | 90.8 | 116.4 | 142.9 |
| 5 | Spinning material + swarf + HCOOH | 98.0 | 132.6 | 153.7 |

In Test 1 the spinning material was firstly heated without additives. The first sign of the exotherm was observed at 204° C. On addition of $Fe_2O_3$, the exotherm was initiated more than 10° C. sooner (spinning material: $Fe_2O_3$= 1:1). On addition of HCOOH (spinning material:HCOOH= 3.1:1.5), the onset temperature fell by almost 60° C. The additional presence of $Fe_2O_3$ (spinning material:$Fe_2O_3$:HCOOH=2.3:0.8:2.1) in the spinning material reduced the onset temperature by yet a further 50 ° C. The dreaded runaway of the decomposition reaction therefore occurred in this case at a temperature of ca. 90 ° C., namely at a temperature which is already lower than the normal processing temperature of spinning material (110°–115° C). Stainless steel swarf in combination with HCOOH has a similar undesirable effect. The stainless steel swarf was the same material as is normally used for pipelines for transporting the spinning material.

These results lead to the conclusion that there is a marked increase in the thermal instability of spinning material in the presence of carboxylic acids and iron oxide or iron ions respectively, wherein the simultaneous occurrence of both substances decreases the decomposition temperature to such an extent that risk-free processing of the spinning material is no longer possible.

Tests 1–5 should be regarded as basic tests wherein the addition of HCOOH is supposed to simulate the presence of the carboxylic acids which are formed in the spinning material as a result of the degradation reactions of cellulose and NMMO. The tests are also comprehensible with other acid decomposition products such as arise in the NMMO-cellulose system.

The addition of $Fe_2O_3$ (powdered; manufacturer: Aldrich) or stainless steel swarf respectively is supposed to simulate the local occurrence of iron, for example at the contact surfaces of the spinning material and the steel parts of the plant. Despite the use of stainless steel for plant components, the emission of iron and other metals can never be excluded.

The weight ratios chosen between the additives $Fe_2O_3$/HCOOH and the spinning material in the tests 1–5 may seem to be high at first sight but this arises from the high viscosity of the spinning material because thorough mixing does not occur for example during the transport of the heated spinning material through a steel pipe and thus at some contact surfaces, in microscopic regions for example, the above ratios could occur. In this case exothermic reactions occur in these small regions. The heat of reaction thus arising cannot be dissipated, on account of the viscosity of the spinning material and its poor thermal conductivity, and this leads to local overheating which then also triggers exothermic reactions in the surrounding regions. It is assumed in this way that a kind of chain reaction occurs which initiates the deflagrations and explosions described above.

Table I shows that the acids formed as degradation products, which can be enriched for example by cumulative effects due to incomplete reaction during the actual course of the process, sensitise the spinning material to metals to a high degree. This is the finding on which the present invention is based and from this finding stems the concept that in addition to an antioxidant in the spinning material there must also be an adequate amount of a substance acting as a base in order to ensure risk-free processing of the spinning material. How large this amount must be depends on the nature of the base used, on the acid content of the NMMO used and on the processing time of the heated spinning material up until the time of precipitation. As described below in detail, it is possible in a simple way for the expert to determine by titration the optimum amount of base needed to neutralise the acid present. The addition of a reserve of base is also advantageous. As a safeguard, the expert can determine the effectiveness of the base addition by means of the DSC test described in the following.

B1) Effect of GPE on a Substitute Solution for Spinning Materials

As already mentioned above, those substances whose addition is proposed in the prior art to prevent the degradation of cellulose, actually contribute to the thermal instability of the spinning material. The destabilising effect of GPE on the NMMO-cellulose-solution, especially in the presence of metals, is seen in a model system in FIG. 1.

Figure 1:
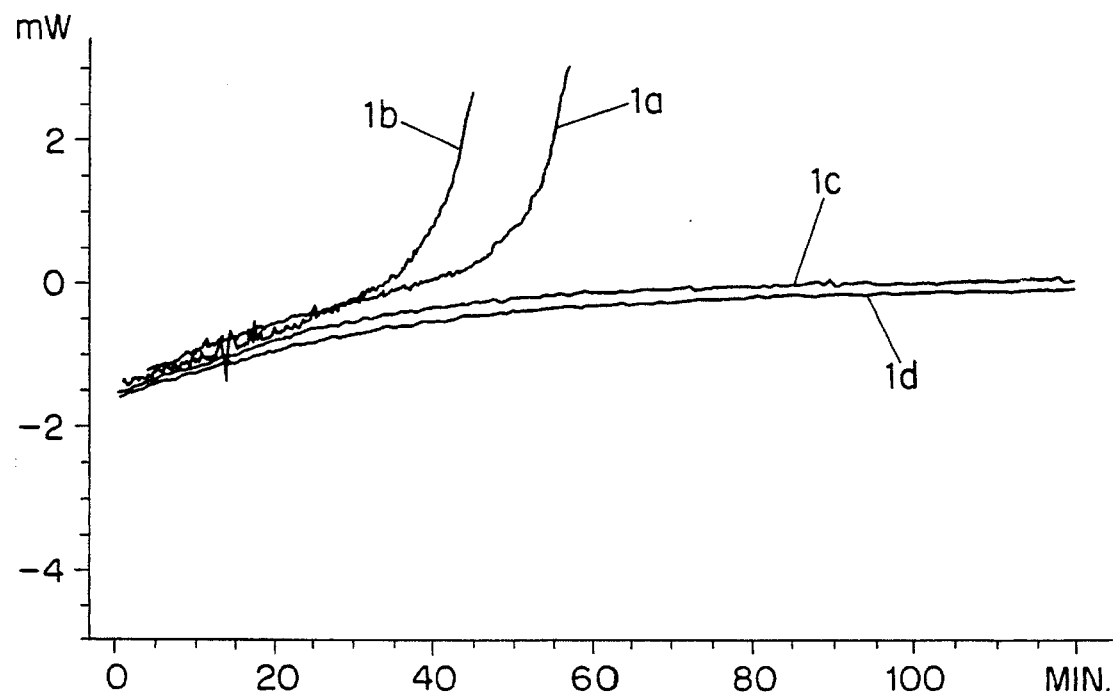
FIG. 1 shows four DSC plots (curves 1a, 1b, 1c and 1d) which were obtained isothermally at 112° C. (plot of time in minutes against heat flux in milliwatts) using a substitute solution for the spinning material. As the substitute solution a mixture of 62,9% NMMO, 27% water, 10% β-methylglycoside and 0.1% glucose (to simulate the end groups in cellulose) was used and to this mixture was added a homogeneous mixture of $Fe_2O_3$ and metallic copper (the materials known as the main problem) in a ratio of 9:1 in order to initiate the decomposition reactions. The overall ratio of the two mixtures to one another was ca. 2:1.

To test the effect of GPE in the same overall conditions, mixtures were made up without GPE (curve 1a), with the addition of 0.5 wt % GPE (curve 1b), with the addition of 0.5% NaOH (curve 1c) and with the combination according to the invention of GPE (0.5%) and NaOH (0.5%). From FIG. 1 it can be seen that in the mixture without added GPE, the decomposition reaction ran away after ca. 55 minutes. The presence of GPE shortened this time to ca. 40 minutes which shows that GPE increases the thermal instability. Stabilising the cellulose against degradation, especially in the presence of metals, is obviously at the expense of a certain decrease in the safety of the spinning material.

Curve 1c shows that addition of 0.5% NaOH practically prevents the thermal instability since the mixture itself still shows no exotherm after heating for 120 minutes. It is assumed that in this mixture, because of the lack of GPE and the presence of NaOH, the polymer substitute is subject to considerable degradation (see below).

Curve 1d represents the behaviour of the spinning material according to the invention. Here the prevention of cellulose degradation is not achieved at the expense of increased instability of the material; the stability is indeed far higher than the stability without GPE addition.

B2) Effect of GPE on Spinning Materials (Laboratory Spinning Materials)

Test 6

21.6 g 83% NMMO -monohydrate was weighed into a beaker and melted with microwave energy. The molten monohydrate was transferred into a thermostated vessel.

Immediately thereafter 2.2 g cellulose (beech synthetic fibre cellulose with a degree of polymerisation of ca. 630 and a residual moisture content of 8%) was added and the spinning material so obtained was stirred vigorously with a metal rod for 20 minutes.

To determine the degree of polymerisation (Dr) of the cellulose, 2 g of the above spinning material was spread as a film into a beaker using a spatula and treated with 150 ml water. Within the following hour, the first wash phase was discarded and the aqueous phase was renewed once again when an increasing degree of solidification and bleaching-out of the spinning material could be observed. After further standing at room temperature the solid specimen was subjected to a DP determination according to the CUEN method (K Götze, "Chemifasern nach dem Viskoseverfahren", 2nd Volume, 3rd Edition, page 1003).

The DP results are given below in Table II.

Test 7

Test 6 was repeated with the difference that after melting the NMMO, 0.2 wt % GPE (based on the amount of solution) was added. The DP result is given in the following Table II.

To determine thermal instability, 5.5 mg of the above laboratory spinning material was weighed and was superficially mixed in a ratio of 2:1 with a mixture consisting of 9 parts $Fe_2O_3$ and 1 part Cu powder. Under nitrogen at 20 bar back pressure, the specimen so obtained was dynamically heated at 10° C./rain to 112° C. and was maintained isothermally at this temperature. The result is given in FIG. 2 (curve 2a).

Test 8

Test 6 was repeated with the difference that after melting the NMMO, 0.11 wt % NaOH (based on the amount of solution) was added. The DP results are given in the following Table II.

Test 9

Test 6 was repeated with the difference that after melting the NMMO, 0.85 wt % TBAH (tetrabutylammonium hydroxide; based on the amount of solution) was added. The DP results are given in the following Table II.

Tests 10 and 11

Test 7 was repeated with the difference that immediately after melting the NMMO and before the addition of 0.2 wt % GPE, there was added 0.11 wt % NaOH (analogously to test 8) and 0.85 wt % tetrabutylammonium hydroxide (analogously to test 9) respectively. The DP results are given in the following Table II. The thermal instabilities were also measured in accordance with test 7. The results are given in FIG. 2 (curves 2b and 2c respectively).

TABLE II

| Test | Additive | DP of the cellulose |
|---|---|---|
| 6 | — | 430 |
| 7 | GPE | 600 |
| 8 | NaOH | 460 |
| 9 | TBAH | 450 |
| 10 | GPE + NaOH | 590 |
| 11 | GPE + TBAH | 600 |

Figure 2:
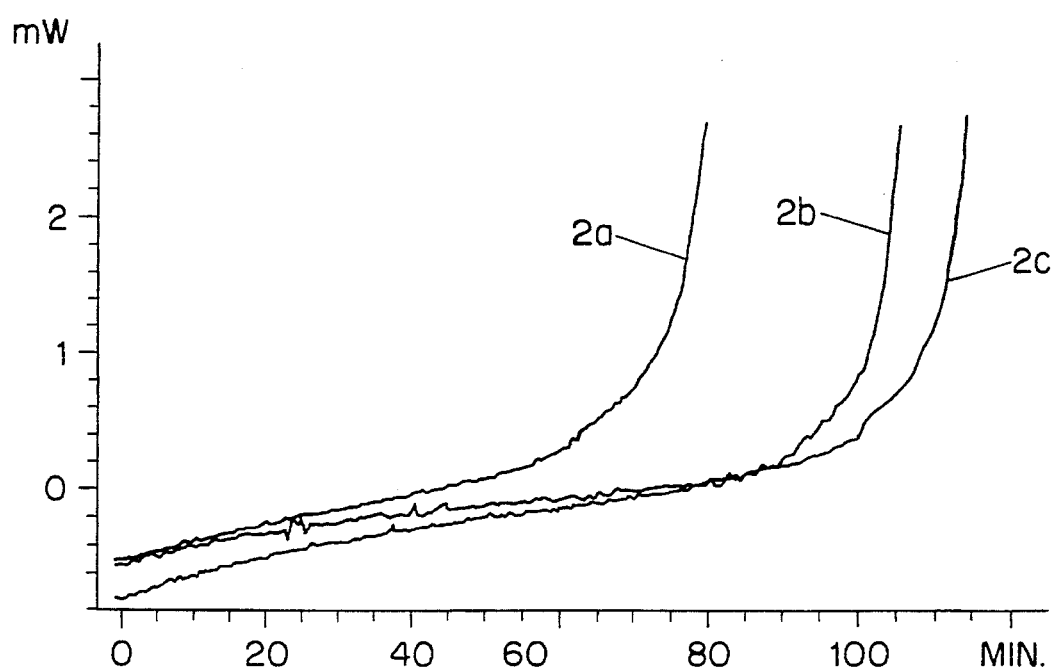

It can be seen from Table II that addition of NaOH alone (thus without GPE) degrades the cellulose whilst a combination of antioxidant (GPE) and base (NaOH) counteracts the cellulose degradation just as well as GPE alone. FIG. 2 shows that even with a low base content of 0.11 wt % NaOH, the spinning material according to the invention (curves 2b and 2c) has a higher thermal stability than the laboratory spinning material stabilised solely with GPE (curve 2a). To complete the picture it should be said that spinning materials which have been prepared in the laboratory have a somewhat higher thermal stability than the spinning materials which occur in the actual process (process spinning materials).

An overall view taken from Table II and FIG. 2 reveals the advantageous properties of the spinning materials according to the invention: higher thermal stability with a higher degree of polymerisation of the cellulose at the same time.

B3) Effect of Hydroxylamine on the Spinning Material

Several kneaded spinning materials were prepared according to the process given in the following Section C, wherein hydroxylamine and a combination of hydroxylamine and GPE were used however as the antioxidant. The degree of polymerisation of the dissolved cellulose was determined by the process given above in test 6. The DSC plots to determine the thermal instability of the kneaded spinning materials were produced in analogous fashion to those in test 7. The results are given in the following Table III:

TABLE III

| Test | Stabiliser | DP | Start of exotherm |
|---|---|---|---|
| 12 | 0.2% NaOH | 600 | 53 |
| 13 | 0.5% NaOH | 610 | 58 |
| 14 | 0.5% NaOH + 0.1% $NH_2OH$ | 690 | 67 |
| 15 | 0.025% GPE | 580 | 32 |
| 16 | 0.5% NaOH + 0.025% GPE + 0.1% $NH_2OH$ | 680 | 63 |

The hydroxylamine was used as the hydrochloride in all examples. The start of the exotherm is that time in minutes after which the sample, already heated to 112° C., shows the first signs of an exothermic reaction. The earlier the exothermic reaction starts, the less stable is the specimen.

It can be seen from Table III that hydroxylamine in combination with base not only counteracts the degradation of the cellulose but also considerably increases the thermal stability of the spinning material.

C) Effect of the Combination Antioxidant/Base on the Cellulose

Three kneaded spinning materials X, Y and Z were prepared according to the following process (the weights added relate to 200 g of spinning material):

The base and/or antioxidant named below were weighed into a 250 ml beaker. Thereafter 221 g of 70% NMMO solution was added, the mass was stirred for 5 minutes at room temperature and then the solution was put into a kneader.

The beaker was dried out with 25.5 g fibrous, milled, air-dried cellulose (ca. 94%) to clean the beaker quantitatively and then the cellulose was also put into the kneader.

The mixture was dispersed for 15 minutes at room temperature at 250 mbar and then heated (thermostat setting 130° C.). The first drops of water distilled off at ca. 90° C., indicating the actual start of dissolution. 5 minutes later the pressure was decreased at appropriate time intervals by 25 mbar each time down to 50 mbar. The end of the dissolution process was reached after ca. 1 hour.

In accordance with this general process, the following spinning materials were prepared: X with 0.1% NaOH; Y with 0.025% GPE; Z with 0.1% NaOH+ 0.25% GPE.

The three spinning materials were each heated to 120° C. and the decrease of relative viscosities were observed over a period of 6 hours. The decrease of relative viscosity corresponds to the degradation of the cellulose so that in this way the effectiveness of the cellulose stabilisation can be found. The results are shown in FIG. 3.

Figure 3:
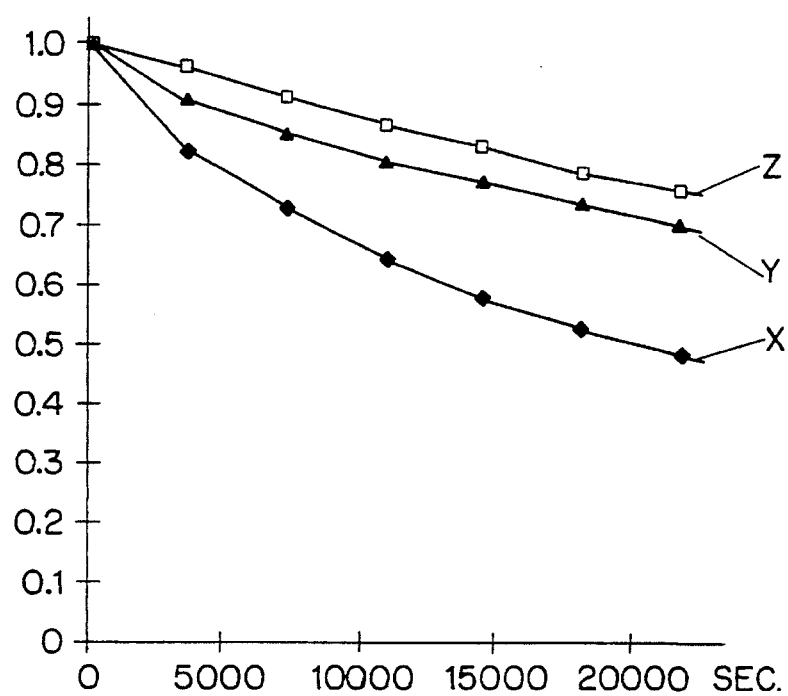

It can be seen from FIG. 3 that the combined addition of NaOH and GPE (curve Z) stabilises the cellulose better than the sole use of the known cellulose stabiliser GPE (curve Y). NaOH is shown to be a poorer cellulose stabiliser when it is used alone.

D) Effect of Base on the Cellulose

As already mentioned above, the inventor has ascertained that exclusive stabilisation with base is strongly concentration dependent and it is therefore very sensitive to use in practice. It can be shown on the one hand that low base concentrations offer practically no effective stabilisation against the degradation process whilst on the other hand the use of high base concentrations is questionable, especially with extended heating times, since decomposition is set off which is initially delayed but which then becomes all the more rapid and degradation of the cellulose occurs. This can be seen in FIG. 4.

Figure 4:
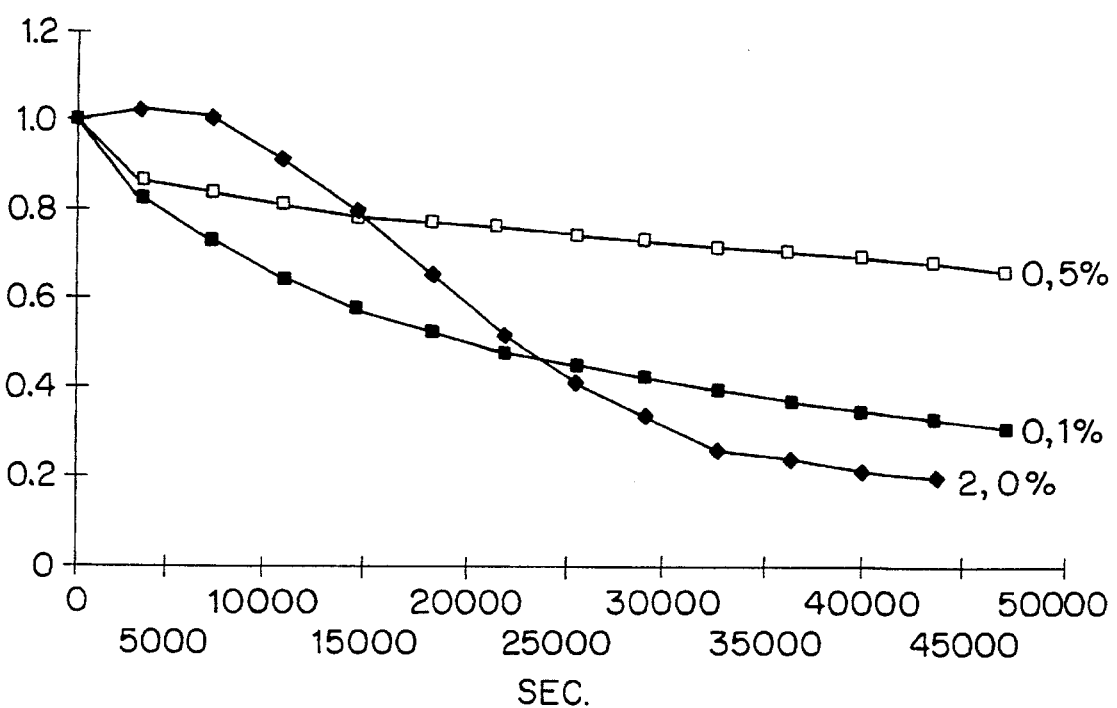

FIG. 4 shows the decrease in relative viscosity related to time for 3 spinning materials which were stabilised only with NaOH at 3 different concentrations (0.1%, 0.5% and 2.0%). At the higher concentration of NaOH (2.0%) the viscosity actually rises in the short term but then rapidly decreases. Concentrations below 0.5%; are favoured since they attack the cellulose less during more lengthy exposure times.

E) Adequate base content in the NMMO-cellulose-solution (process spinning material= process spinning mass).

As mentioned above, it is of crucial importance that an adequate amount of base is present in the spinning material to retard the explosive decomposition of heated process spinning material. Whether an adequate amount of base is present can be determined by the micro-test described in detail as follows.

In the context of the present invention, an adequate amount of base is present when the relevant specimen of spinning material has:

1. a mean value of at least 60 minutes for the initiation point, determined in at least 3 independent DSC micro-tests, and 2. a mean value of at least 80 minutes to attain the 3 mW-criterion ("time-iso"), determined in at least 3 independent DSC micro-tests, wherein the DSC tests are carried out using a pressure-DSC from the Mettler company (Thermosystems 4000) with the following configuration and in the following test conditions.

Configuration of the pressure-DSC:
For control and evaluation: TA-processor TC11
Evaluation software: TA72AT.2
Measurement: Pressure DDK measuring cell DSC27HP
Installed printer: Epson FX 850
Test conditions:

The spinning material to be tested is weighed (5.5 mg±0.4 mg) in the cooled solid state into a perforated aluminium cup (open system) and soon thereafter brought into intimate contact with an "explosion initiator", i.e., a homogeneous mixture of 9 parts by weight $Fe_2O_3$ (manufacturer: Aldrich, type No. 3924) and 1 part by weight metallic copper (manufacturer: Merck, type No. 2715) in the ratio 2:1 (2 parts spinning material: 1 part mixture).

To undertake the actual DSC-measurement, the measuring chamber is pressurised with 20 bar nitrogen after introducing the aluminium cup.

Then starting at a temperature of 40° C., heating is carried out at a rate of 10° C./min to a temperature of 112° C., The specimen is then held at 112° C. for a period of 120 minutes maximum and the DSC curve is recorded during this time.

Figure 5:
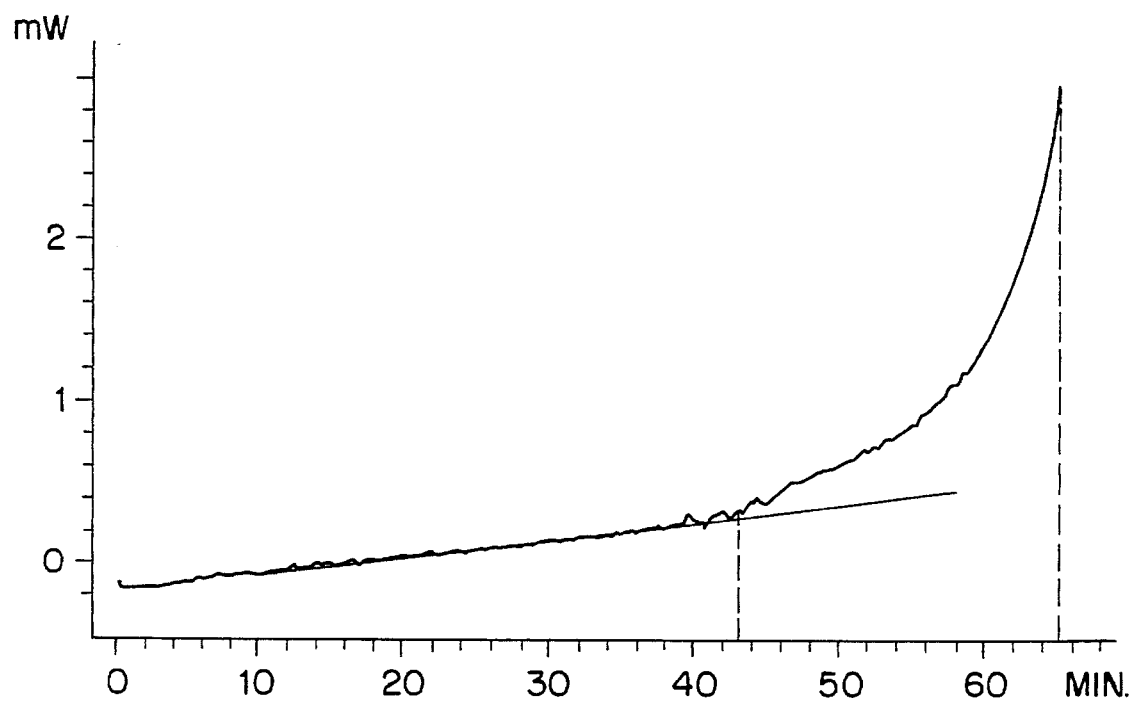
Figure 6:
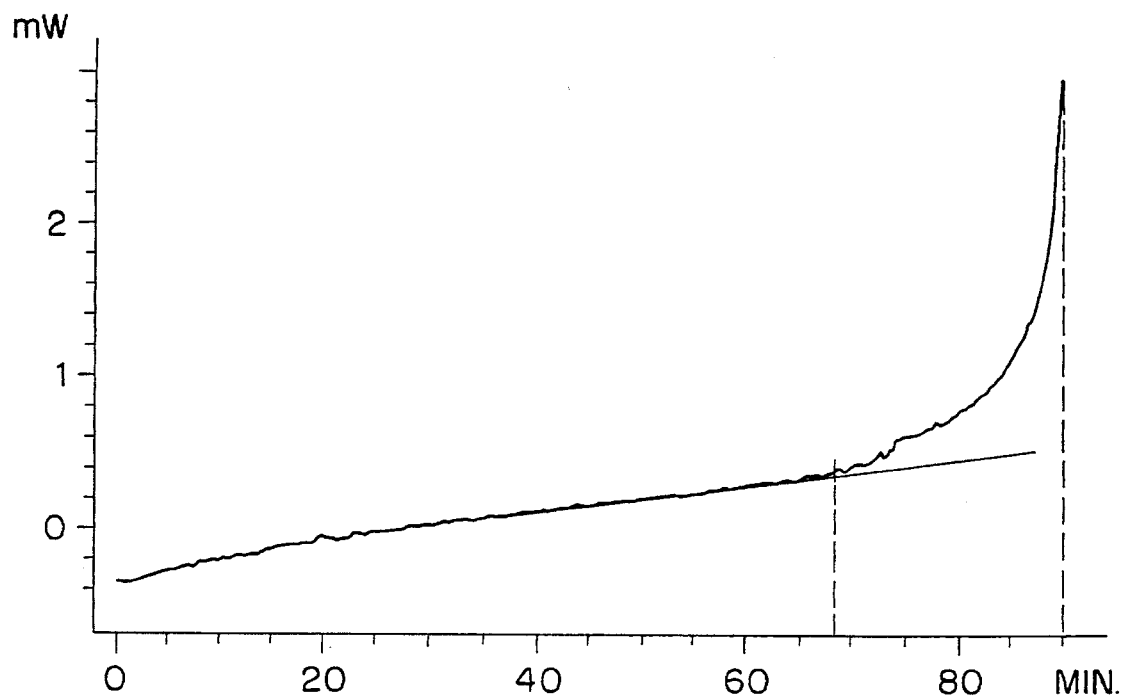

The processes of heating to 112° C. and holding at this temperature are stored in the processor of the DSC equipment, and the latter is continuously coupled to give the equivalent conditions. FIGS. 5 and 6 show as an example two DSC-plots which were recorded at 112° C. in the above conditions, wherein FIG. 5 refers to a spinning material from the prior art (77.5% NMMO, 12% cellulose, 10.5% water) which was stabilised exclusively with 2000 ppm GPE (based on the cellulose), and FIG. 6 refers to a spinning material according to the invention (77.5% NMMO, 12% cellulose, 10.5% water) which was stabilised with 2000 ppm GPE (based on the cellulose) and 800 ppm NaOH (based on the solution).

In both Figures, milliwatts (mW) of the energy output are plotted as the ordinate and time is plotted as the abscissa, The points on the time curve which indicate the initial climb into the exothermic region are now determined; they are the initiation points, This initial climb is best determined by drawing a tangent at the lower part of the curve. The initiation point for the known spinning material (FIG. 5) is seen to be 43 minutes and that for the spinning material according to the invention (FIG. 6) is seen to be 68 minutes. The time to attain the 3 mW criterion ("time iso") amounts to 65 minutes for the known spinning material and 90 minutes for the spinning material according to the invention.

As mentioned above, the determinations to find whether the spinning material has adequate base present must be carried out three times for each test and the arithmetic mean values calculated. The spinning material has adequate basicity present when not only the first mean value is 60 minutes (or above) but also the second mean value is 60 minutes (or above);

F) Setting an Advantageous Base Content in the Cellulose-NMMO-Solution

It has been shown that an adequate base content is present in any case if an aqueous NMMO solution which contains practically no free carboxylic acids is used for the preparation of the spinning material according to the invention. So that the amount of base necessary to neutralise the COOH groups can be adjusted, it is desirable firstly to determine the content of free carboxylic acids in the aqueous NMMO.

By the term "free carboxylic acids" is meant any compounds which carry a COOH group which has not been neutralised to the corresponding carboxylate. These compounds are present not only in commercially-available NMMO but also in those aqueous NMMO solutions which are recycled from the precipitation bath and which are used afresh for the preparation of spinning material. The carboxylic acids cause a depression of the pH in NMMO; thus whilst for example a solution of pure NMMO in water has a pH of above 10.5, spinning baths have pH values which are substantially lower and can for example be between 6.5 and 7.5. This depression of the pH is attributed not only to a dilution effect but also to the free carboxylic acids which are formed in a wide variety of degradation processes or chemical reactions respectively.

It has now been shown that the aqueous NMMO-solution can be titrated in a conventional way with strong bases and that during the constant addition of base the titration curve shows the steep gradient somewhere in the region between pH 7 and pH 11 which is characteristic of titration curves; this is caused by the rapid increase in the pH value of the titration solution. It is assumed that the free carboxylic acids present in the solution are responsible for the gradient in the titration curve. The equivalence point of the curve is somewhere in the region from pH 8.5 to 9.5, the value determined in individual cases being naturally dependent on the quality of the NMMO used.

The free carboxylic acid content of the aqueous NMMO solution can therefore be determined by titration wherein a weighed amount of aqueous NMMO solution, whose NMMO content naturally is known or optionally must be determined by means of a conventional analytical process, is diluted with water and then titrated with NaOH and the amount of base is calculated which must be added to the aqueous NMMO solution to neutralise the free carboxylic acids. When an NMMO solution of that type is used to prepare the spinning material then it is assured that an adequate amount of basicity, within the context of the present invention, is present in the spinning material.

In addition to this amount of base calculated from the titration, it is advantageous to add yet a second amount of base to the NMMO solution as excess base to provide a base reserve in the spinning material to neutralise the acids which are formed during the NMMO processes, namely during the preparation and processing of the spinning material. Such a reserve of base additionally increases safety. With strong bases (alkali hydroxides), this second amount of base is desirably between 0.001% (10 ppm) and 0.5% (5000 ppm) of the weight of the NMMO solution used to prepare the spinning material. With weak bases, such as for example amines, maximum amounts up to 5% can be effective. It is obvious that the expert will balance the amount of excess used in individual cases with the amount of acid which is formed depending on the relevant process characteristics. It has generally been shown that with alkali hydroxides the upper limit of 0.5% should not be exceeded with regard to the retardation of the degradation of cellulose.

At what point in the NMMO circulation the base is added or the carboxylic acid is neutralised respectively is not an essential feature of the present invention. Thus the base can be added, for example, to the used spinning bath liquid before, during or after its purification, or during or after its concentration. It is also conceivable that the base could be added even during the preparation of the cellulose suspension, thus mixing the cellulose together with the necessary amount of base into the recycled NMMO-solution which still contains free carboxylic acids. The only essential feature is that adequate basicity is present in the spinning material.

We claim:

1. A composition for moulding or spinning comprising cellulose, aqueous tertiary amine oxide, nonsolvent, and a stabilizer component comprising one or more stabilizers which altogether have a basic and an antioxidant action wherein said stabilizer having basic action is a nonphosphate material and said stabilizer component having antioxidant action comprises an antioxidant selected from the group consisting of tannins, phenols, glyceraldehyde, and one or more organic compounds having at least four carbon atoms and at least two conjugated double bonds, wherein the organic compound contains at least two selected from the group consisting of hydroxyl and an amino group having at least one hydrogen atom, and combinations thereof.

2. A composition according to claim 1 wherein the stabilizer component comprises an antioxidant and hydroxide ions.

3. A composition according to claim 1 wherein the organic compound is an organic polyhydroxy compound.

4. A composition according to claim 3 wherein the organic polyhydroxy compound is selected from the group consisting of pyrocatechin, pyrogallol, gallic acid, gallic acid methyl ester, gallic acid ethyl ester, gallic acid propyl ester, and gallic acid isopropyl ester.

5. A composition according to claim 1 wherein the stabilizer component comprises an antioxidant and a stabilizer providing basic action selected from the group consisting of alkali hydroxide, amine and combinations thereof.

6. A composition according to claim 1 wherein the stabilizer component comprises gallic acid propyl ester and sodium hydroxide.

7. A composition according to claim 1, 2, 3, 4, 5, or 6 wherein the antioxidant is present in an amount of at least 100 ppm of cellulose in the composition.

8. A composition according to claim 1 wherein the antioxidant is present in an amount of at least 100 ppm of cellulose in the composition.

9. A composition according to claim 1, 2, 3, 4, 5, or 6 wherein the stabilizer component comprises hydroxylamine.

10. A composition according to claim 1 wherein the stabilizer component comprises hydroxylamine.

11. A composition according to claim 1, 2, 3, 4, or 5 wherein the tertiary amine oxide is N-methyl-morpholine-N-oxide.

12. A composition according to claim 1 wherein the tertiary amine oxide is N-methyl-morpholine-N-oxide.

13. Process for the preparation of a composition for moulding or spinning comprising the steps of providing an aqueous tertiary amine oxide solution, adding base to the aqueous tertiary amine oxide solution, suspending cellulose in the tertiary amine oxide solution, adding a stabilizer which acts as an antioxidant said stabilizer component having antioxidant action comprises an antioxidant selected from the group consisting of tannins, phenols, glyceraldehyde, and one or more organic compounds having at least four carbon atoms and at least two conjugated double bonds, wherein the organic compound contains at least two selected from the group consisting of hydroxyl and an amino group having at least one hydrogen atom, and combinations thereof, to the cellulose suspension, and converting the cellulose solution to a composition for moulding and spinning by application of heat and reduced pressure.

14. Process according to claim 13 wherein the base comprises hydroxide ions.

15. Process according to claim 14 wherein the organic compound is an organic polyhydroxy compound.

16. Process according to claim 15 wherein the organic polyhydroxy compound is selected from the group consisting of pyrocatechin, pyrogallol, gallic acid, gallic acid methyl ester, gallic acid ethyl ester, gallic acid propyl ester and gallic acid isopropyl ester.

17. Process according to claim 13 wherein the organic compound is an organic polyhydroxy compound.

18. Process according to claim 17 wherein the organic polyhydroxy compound is selected from the group consisting of pyrocatechin, pyrogallol, gallic acid, gallic acid methyl ester, gallic acid ethyl ester, gallic acid propyl ester, and gallic acid isopropyl ester.

19. Process according to claim 13 wherein the base is selected from the group consisting of alkali hydroxide, amine and combinations thereof.

20. Process according to claim 13 wherein the base comprises sodium hydroxide and the antioxidant comprises gallic acid propyl ester.

21. Process according to claim 13, 14, 17, 18, 19, 20, 15 or 16 wherein the antioxidant is present in an amount of at least 100 ppm of cellulose in the composition.

22. Process according to claim 13 wherein the antioxidant is present in an amount of at least 100 ppm of cellulose in the composition.

23. Process according to claim 13, 14, 17, 18, 19, 20, 15 or 16 where in the antioxidant comprises hydroxylamine.

24. Process according to claim 13 wherein the antioxidant comprises hydroxylamine.

25. Process according to claim 13, 14, 15, 18, 19, 20, 15, or 16 wherein the tertiary amine oxide is N-methyl-morpholine-N-oxide.

26. Process according to claim 13 wherein the tertiary amine oxide is N-methyl-morpholine-N-oxide.

27. Process for the continuous preparation of cellulose mouldings comprising the steps of:
(a) forming a suspension of cellulose by mixing cellulose into an aqueous tertiary amine oxide solution
(b) forming a cellulose solution from the suspension by application of heat and reduced pressured,
(c) moulding the cellulose solution and conveying it into a precipitation bath thereby precipitating out a cellulose moulding from the precipitation bath,
(d) purifying the precipitation bath used to precipitate out the cellulose moulding, and
(e) concentrating the purified precipitation bath to obtain an aqueous tertiary amine oxide solution for use in (a) wherein one or more stabilizers are added which altogether have a basic and antioxidant action, said stabilizer added except during step (b) and step (c).

28. Process according to claim 27 wherein a stabilizer having antioxidant action is added immediately before or during step (a).

29. Process according to claim 27 or 28 wherein a stabilizer acting as a base is added after step (c) and before step (a).

30. Process according to claim 27 or 28 wherein the tertiary amine oxide is N-methyl-morpholine-N-oxide.

31. Process according to claim 24 wherein the organic compound is an organic polyhydroxy compound.

32. Process according to claim 31 wherein the organic polyhydroxy compound is selected from the group consisting of pyrocatechin, pyrogallol, gallic acid, gallic acid methyl ester, gallic acid ethyl ester, gallic acid propyl ester, and gallic acid isopropyl ester.

33. Process according to claim 31 wherein the stabilizer comprises a base selected from the group consisting of alkali hydroxide, amine and combinations thereof.

34. Process according to claim 31 wherein the stabilizer comprises sodium hydroxide and gallic acid propyl ester.

35. Process according to claim 31 wherein the stabilizer comprises hydroxylamine.

* * * * *

UNITED STATES PATENT AND TRADEMARK OFFICE
CERTIFICATE OF CORRECTION

PATENT NO. : 5,556,452

DATED : September 17, 1996

INVENTOR(S) : Wolfram Kalt, Johann Männer, Heinrich Firgo

It is certified that error appears in the above-indentified patent and that said Letters Patent is hereby corrected as shown below:

Title page, 2nd col., 4th line, "2570." should read --2570 (1986).--

Col. 2, line 18, "hydrolyrically" should read --hydrolytically--

Col. 3, line 46, "Langet" should read --Lang et--

Col. 4, line 21, "Langet" should read --Lang et--

Col. 5, line 47, "bases" should read --base--

Col. 6, line 17, "below, it" should read --below. It--

Col. 6, line 23, "MNNO" should read --NMMO--

Col. 6, line 31, " , it" should read -- . It--

Col. 6, line 41, "NNMO" should read --NMMO--

Col. 6, line 60, "bases:" should read --bases--

Col. 7, line 40, "act" should read --acting--

Col. 7, line 59, "NNMO" should read --NMMO--

Col. 8, line 16, "characterised ..." should start a new line at the left margin

UNITED STATES PATENT AND TRADEMARK OFFICE
CERTIFICATE OF CORRECTION

PATENT NO. : 5,556,452

DATED : September 17, 1996

INVENTOR(S) : Wolfram Kalt, Johann Männer, Heinrich Firgo

It is certified that error appears in the above-indentified patent and that said Letters Patent is hereby corrected as shown below:

Col. 8, line 47, "Nettler" should read --Mettler--

Col. 11, line 6, "(Dr)" should read --(DP)--

Col. 13, line 41, "0.5%; are" should read --0.5% are--

Col. 14, line 53, "second mean value is 60 minutes" should read --second mean value is 80 minutes--

Col. 14, line 54, "above);" should read --above).--

Col. 16, lines 53-62, delete "said stabilizer component ... thereof," and substitute --selected from the group consisting of tannins, phenols, glyceraldehyde, and one or more organic compounds having at least four carbon atoms and at least two conjugated double bonds, wherein the organic compound contains at least two selected from the group consisting of hydroxyl and an amino group having at least one hydrogen atom, and combinations thereof--

Col. 17, line 1, "claim 14" should read --claim 27--

Col. 17, line 28, "where in" should read --wherein--

Col. 17, line 31, "15, 18" should read --17, 18--

Col. 18, line 2, "pressured" should read --pressure--

UNITED STATES PATENT AND TRADEMARK OFFICE
CERTIFICATE OF CORRECTION

PATENT NO. : 5,556,452

DATED : September 17, 1996

INVENTOR(S) : Wolfram Kalt, Johann Männer, Heinrich Firgo

It is certified that error appears in the above-indentified patent and that said Letters Patent is hereby corrected as shown below:

Col. 18, line 13, after "action," insert -- said stabilizer component having antioxidant action comprises an antioxidant selected from the group consisting of tannins, phenols, glyceraldehyde, and one or more organic compounds having at least four carbon atoms and at least two conjugated double bonds, wherein the organic compound contains at least two selected from the group consisting of hydroxyl and an amino group having at least one hydrogen atom, and combinations thereof--

Col. 18, line 24, "claim 24" should read --claim 27--

Col. 18, line 31, "claim 31" should read --claim 27--

Col. 18, line 34, "claim 31" should read --claim 27--

Col. 18, line 36, "claim 31" should read --claim 27--

Signed and Sealed this

Eighth Day of July, 1997

Attest:

Attesting Officer

BRUCE LEHMAN

Commissioner of Patents and Trademarks